US007816637B2

(12) United States Patent  (10) Patent No.: US 7,816,637 B2
Michimori et al.  (45) Date of Patent: Oct. 19, 2010

(54) IMAGE DISPLAY PROJECTOR HAVING A DRIVE UNIT FOR MOVING EITHER A FRESNEL LENS OR A DIFFUSION MEMBER

(75) Inventors: Atsushi Michimori, Tokyo (JP); Junichi Aizawa, Tokyo (JP); Tomohiro Sasagawa, Tokyo (JP); Hiroaki Sugiura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 789 days.

(21) Appl. No.: 11/730,544

(22) Filed: Apr. 2, 2007

(65) Prior Publication Data
US 2007/0247707 A1  Oct. 25, 2007

(30) Foreign Application Priority Data

Apr. 5, 2006 (JP) ............................... 2006-104204
Dec. 25, 2006 (JP) ............................... 2006-347589

(51) Int. Cl.
*H01L 27/00* (2006.01)
(52) U.S. Cl. .................................. 250/208.1; 250/216
(58) Field of Classification Search .............. 250/208.1, 250/216, 239; 353/30, 38, 122; 359/446–451, 359/457, 460, 708; 345/419
See application file for complete search history.

(56) References Cited

U.S. PATENT DOCUMENTS 3,610,728 A  10/1971 Firth
4,143,943 A * 3/1979 Rawson ....................... 359/446
4,317,618 A  3/1982 Murakoshi et al.
4,390,239 A * 6/1983 Huber ......................... 359/446
2007/0035826 A1  2/2007 Yokoyama et al.

FOREIGN PATENT DOCUMENTS

| JP | 49-5256 B | 2/1974 |
| JP | 55-65940 A | 5/1980 |
| JP | 55-146439 A1 | 11/1980 |
| JP | 59-121646 U | 8/1984 |
| JP | 01319026 A | 12/1989 |
| JP | 2005-107150 A | 4/2005 |

* cited by examiner

*Primary Examiner*—Que T Le
(74) *Attorney, Agent, or Firm*—Birch, Stewart, Kolasch and Birch, LLP

(57) ABSTRACT

An image display projector is provided so as to reduce scintillation. The image display projector comprises: an optical engine for emitting light according to an inputted imaging signal; a Fresnel lens disposed to receive the light emitted from the optical engine, for emitting the incident light as collimated one; a diffusion member, placed in front of the Fresnel lens in the light-traveling direction, for diffusing the collimated light emitted from the Fresnel lens; and a drive unit for moving either the Fresnel lens or the diffusion member, along a predetermined track (orbit), in a plane parallel to either the plane from which the collimated light or the diffused light is emitted. And then, the moving velocity of either the Fresnel lens or the diffusion member is at any moment larger than zero in any direction within the parallel plane.

16 Claims, 14 Drawing Sheets

IMAGE DISPLAY PROJECTOR HAVING A DRIVE UNIT FOR MOVING EITHER A FRESNEL LENS OR A DIFFUSION MEMBER

BACKGROUND OF THE INVENTION

1. Field of the Invention

The present invention relates to image display projectors, in particular, to vibration technologies utilized in screens for the image display projectors.

2. Description of the Related Art

In order to achieve high resolution or high brightness (luminance) of images that are displayed by an image display projector such as a rear projection-type television system, as the light source, for example, a laser can be used. However, when the laser is used, in comparison to a conventional projection television-system in which a lamp is used as the light source, so-called scintillation that is a screen-glare phenomenon owing to a speckle pattern becomes more noticeable.

As a conventional method to reduce the scintillation, there exists a method in which a screen is vibrated perpendicularly to an image displaying face of the screen (n perpendicular directions to the screen), or either vertically or laterally with respect to the screen (for example, refer to Japanese Patent Application Publication No. S55-065940 (1980), pp. 4-6, FIG. 1 and FIG. 2).

PROBLEMS TO BE SOLVED BY THE INVENTION

However, when the screen is vibrated in perpendicular directions to the screen, resolution is degraded.

Moreover, when the screen is vibrated either vertically or laterally with respect to the image displaying face of the screen, the screen shifts intermittently. Because of this, when the screen stops, strong scintillation occurs. Therefore, in this case, the scintillation cannot be reduced sufficiently.

Namely, in a case in which the screen shifts intermittently while alternating a motion and a pose, when the screen stops, strong scintillation (glaring phenomenon) appears, and when the screen is moving, the scintillation becomes almost invisible. For this reason, the scintillation (glaring phenomenon) repeatedly changes with time between strong and weak glares (i.e., the change between glaring and not glaring).

Usually, a transmission-type screen is constructed including a Fresnel lens that collimates light from an optical projection system, and a diffusion member (for example, a lenticular-lens screen) that diffuses light and adjusts a viewing-angle distribution of images. Therefore, according to the shift of the overall screen, the Fresnel lens also shifts; thereby, viewing-angle distribution of emitted light from the screen changes. Because of this, a change in the viewing-angle distribution according to the screen's shift is recognized as flicker by a viewer (observer) who watches in a fixed direction.

The present invention has been directed at solving these problems with conventional technologies described above, and an object of the invention is to provide an image display projector (projection-type image display apparatus) and a method of displaying images, that are able to reduce occurrence of scintillation.

SUMMARY OF THE INVENTION

Means for Solving the Problems

In one aspect of the present invention, an image display projector comprises: an optical engine for emitting light according to an inputted imaging signal; a Fresnel lens disposed to receive the light emitted from the optical engine, for emitting the incident light as collimated one; a diffusion member, placed in a position frontal to the Fresnel lens in the light-traveling direction, for emitting diffused light, by diffusing the collimated light emitted from the Fresnel lens; and a drive unit for moving either the Fresnel lens or the diffusion member, along a predetermined track, in a parallel plane being a plane parallel to either the one from which the collimated light is emitted or the one from which the diffused light is emitted, wherein the moving velocity of either the Fresnel lens or the diffusion member is at any moment larger than zero in any direction within the parallel plane.

EFFECTS OF THE INVENTION

According to an image display projector of the present invention, it is possible to reduce scintillation so as to display high quality (definition) images.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
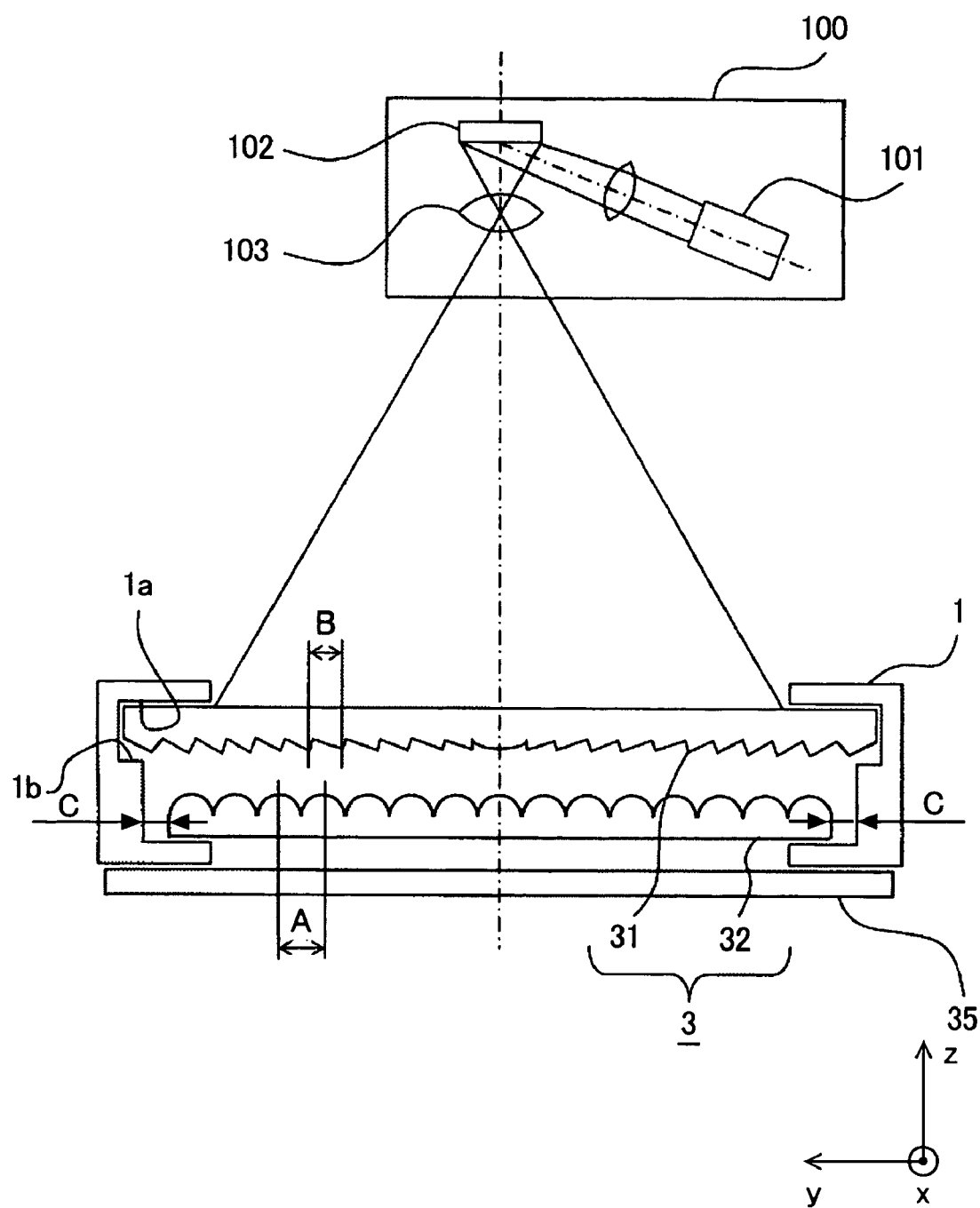
FIG. 1 is a diagram outlining a configuration of an optical projection system in Embodiment 1 of the present invention.

FIG. 1 is a diagram outlining a configuration of an optical projection system of an image display projector in Embodiment 1 of the present invention. In FIG. 1, a cross-section of a frame 1 is formed in a recessed shape; the frame 1 holds a screen 3 that is constructed by sandwiching both a Fresnel lens 31 and a lenticular-lens screen 32. Note that, the lenticular-lens screen 32 is constructed by laminating a lenticular-lens sheet, a scattering layer, black stripes, and the like (not shown in the figure), and acts as a diffusion member.

An optical engine 100 projects images onto the screen 3 from the rear side thereof. The optical engine 100 includes a laser module 101 as a light source, a digital micromirror device (DMD) 102 as a spatial modulator (or light valve) that forms images by spatially modulating light according to an inputted signal, and an optical projection system 103 that projects onto the screen 3 the images as being enlarged.

Along the bottom of the recessed part of the frame 1, a step (uneven part) 1b is formed; the Fresnel lens 31 is held between the step 1b and an inner part 1a of the frame 1.

The lenticular-lens screen 32 is held with a predetermined clearance "C" between the screen and the frame 1, so that the lenticular-lens screen 32 can move in parallel with the plane including the screen face. In addition, on the viewer's side of the frame 1, a transparent protection panel 35 is provided.

Figure 2:
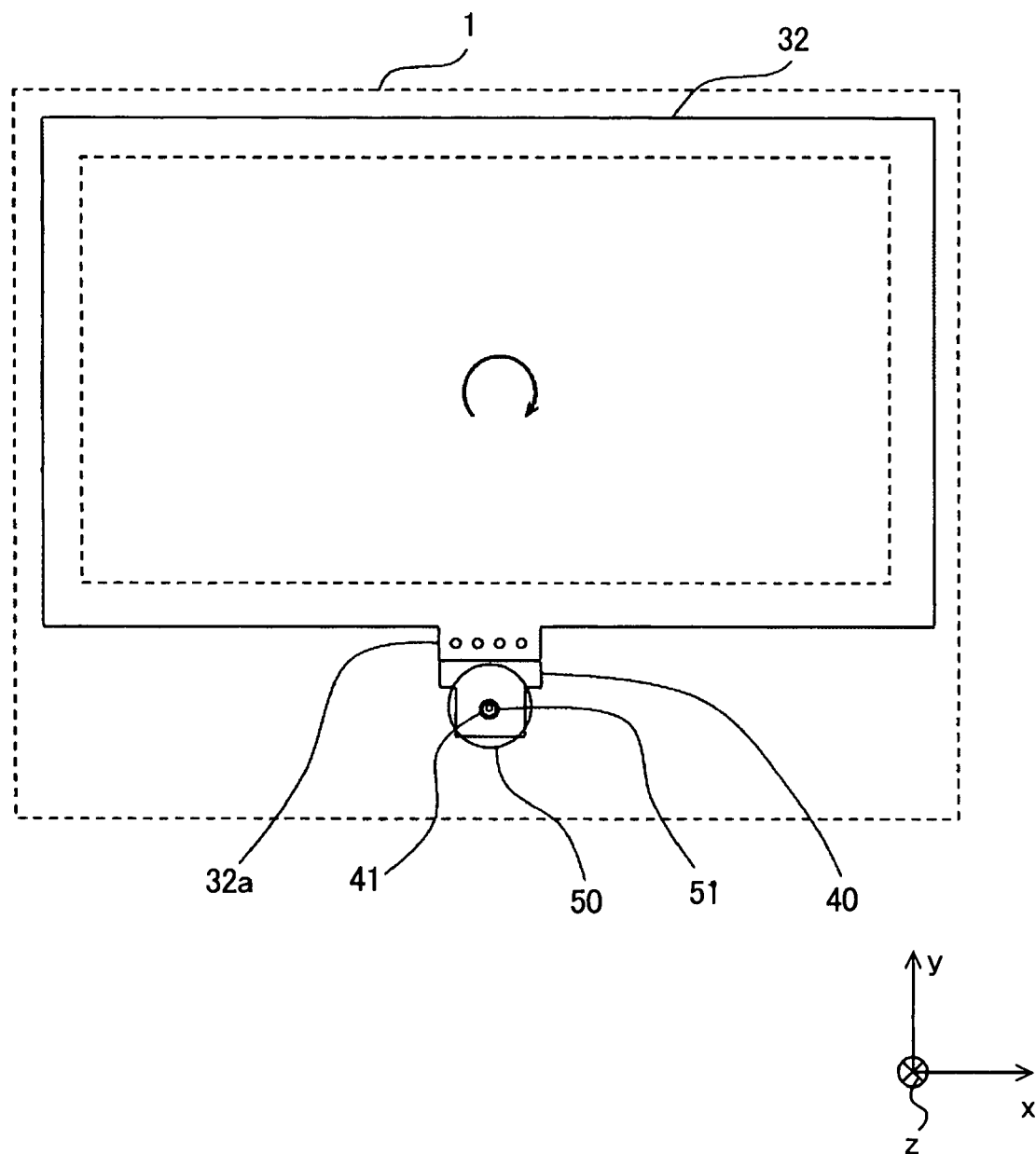
FIG. 2 is a front diagram of a screen in Embodiment 1 of the present invention.

FIG. 2 is a front diagram of the screen 3 in Embodiment 1 of the present invention. The frame 1 is provided with a motor (not shown in the figure), and a drive means (unit) 50 provided with a cam 51 driven by the motor. A transmitting member 40 is fastened securely onto a protrusion 32a that is formed at the lowermost edge of the lenticular-lens screen 32. In addition, the transmitting member 40 is provided extending from the protrusion 32a toward further below. Moreover, the transmitting member 40 is formed with a hole 41 into which the cam 51 is movably inserted.

Figure 3:
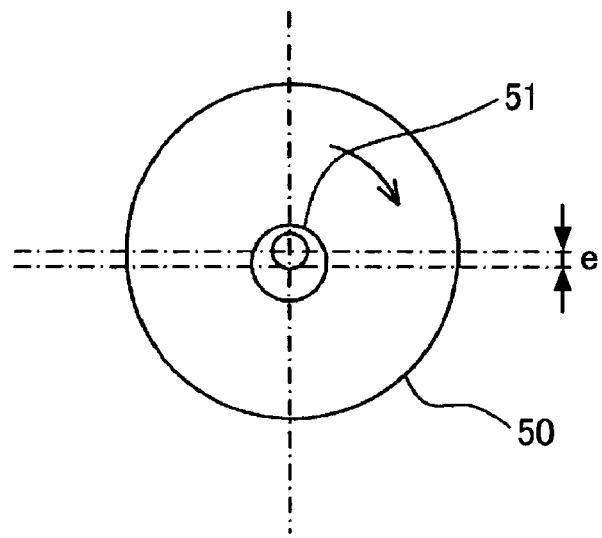
FIG. 3 is a diagram for explaining the operation of a drive means (unit) in Embodiment 1 of the present invention.

Next, the operations of the drive means 50 will be explained using FIG. 3 as follows. When the motor of the drive means 50 starts rotating, the cam 51 also starts a rotational movement. This cam 51 is constructed by a cylindrical shaft; however, the center of the cam 51 (its rim) is displaced with respect to the rotation center of the cylindrical shaft by a predetermined distance (offset). Note that, "e" in FIG. 3 indicates the amount of displacement (offset). And then, according to the rotation of the motor, this cam 51 circulates in a way as indicated by the arrow in FIG. 3. As a result, via the transmitting member 40 that moves according to the rotation of this cam 51, the lenticular-lens screen 32 moves periodically, in a plane parallel to the screen 3 face, along a circular track (an orbit, as indicated by the arrow in FIG. 2). For this reason, the lenticular-lens screen 32 moves continuously without having a pause at any moment, and in any direction. Namely, the moving velocity of the lenticular-lens screen 32 is larger than zero at any moment. In other words, according to the screen 3 in Embodiment 1, differing from the screen described in Japanese Patent Application Publication No. S55-065940 (1980), the moving velocity of the members composing the screen 3 does not momentarily become zero. Thanks to the continuous movement, a state in which the scintillation is reduced can be held.

Moreover, it is preferable to set the moving displacement (offset) of the cam 51 to be larger than either the pitch of a lenticular lens of the lenticular-lens screen 32 (indicated by the double-headed arrow "A" in FIG. 1) or that of the Fresnel lens 31 (indicated by the double-headed arrow "B" in FIG. 1), being selected.

Imaging light enlarged by the optical engine 100 and emitted therefrom enters the Fresnel lens 31 obliquely over approximately all the image display area (the screen). Because of this, when the Fresnel lens 31 moves in the plane parallel to the screen face, in a case in which the Fresnel lens 31 moves, even if slightly, perpendicularly to the screen, there arises a change in a position where the light emitted from the optical engine 100 enters the Fresnel lens, causing distortion of images that are displayed in the image display area (the screen).

However, when only the lenticular-lens screen 32 is moved, while the Fresnel lens 31 remains fixed, there does not arise a change in the position where the light emitted from the optical engine 100 enters the Fresnel lens; light passed through the Fresnel lens 31 is collimated by the Fresnel lens 31, and the collimated light shines the lenticular-lens screen 32. For this reason, even when the lenticular-lens screen 32 moves perpendicularly to the screen to some small extent, distortion of the images is hardly generated in the image display area (the screen). Therefore, in a screen in which the Fresnel lens 31 is not moved as in this embodiment, image distortion owing to the movement of the lenticular-lens screen 32 is hardly generated. In addition, according to the screen in this embodiment, it is possible to prevent flicker from being recognized by the viewer.

As described above, the screen provided for the image display projector in this embodiment is constructed in such a way that the lenticular-lens screen 32 is held having a predetermined clearance between itself and the Fresnel lens 31, so that only the lenticular-lens screen 32 is able to be moved. Because of this, even when the lenticular-lens screen 32 moves, the Fresnel lens 31 remains fixed; thus, a change in the viewing-angle distribution does not occur. Therefore, the flicker cannot be recognized by the viewer.

In addition, because the lenticular-lens screen 32 circulates, scintillation is not reduced intermittently; thus, high quality images can be stably displayed using this image display projector.

Moreover, according to the image display projector in this embodiment, the entire screen 3 does not move, but only parts of the members composing the screen 3 move. For this reason, in comparison to the case in which the entire screen 3 is moved, it is possible to move the parts of the members with a small driving force. Therefore, the image display projector can be constructed more easily at low cost.

Note that, scintillation is a phenomenon that occurs due to the fact that the optical characteristics of constituting members of the screen 3 spatially have fine fluctuations in the plane including the screen face. By moving the parts of the members composing the screen 3, the scintillation is reduced; this is because, by the movement of the parts of the members, these fine fluctuations in the plane including the screen face are spatially averaged.

Therefore, in the light-traveling direction, when other members are placed frontal to the moving members, there remain influences owing to unevenness in optical characteristics caused by the other members. Because of this, it is preferable to determine from among those members so that the moving members be placed nearest to the viewer.

Furthermore, the relationship between the amount of scintillation and a moving velocity of the lenticular-lens screen 32

Figure 4:
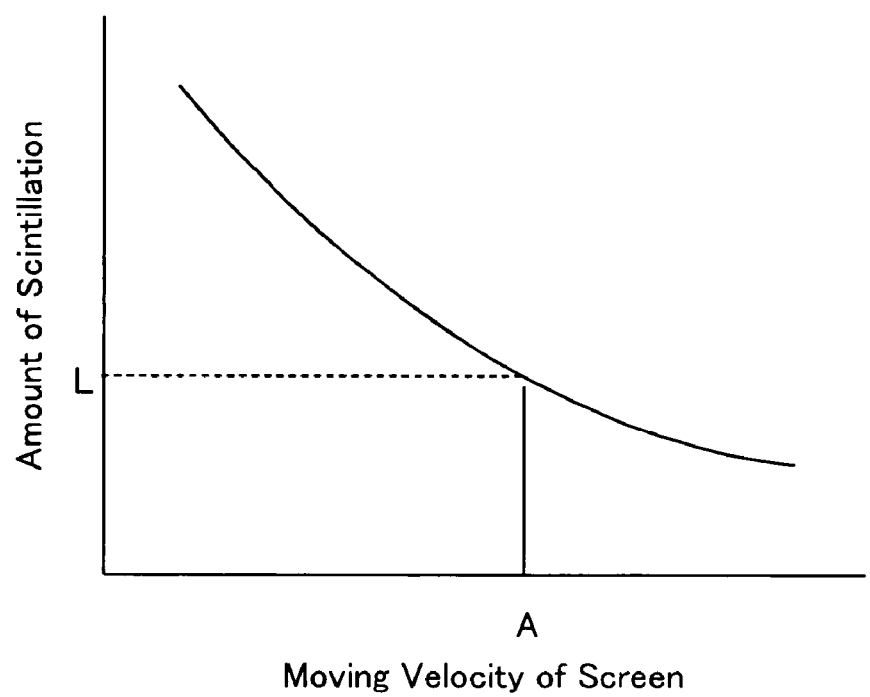
FIG. 4 is a diagram for explaining the relationship between the amount of scintillation and moving velocity of a diffusion member (screen)

(diffusion member) has been investigated, and its measured results are shown in FIG. 4. Here, the "amount of scintillation" is a numerically evaluated value, using a predetermined method, of to what extent a viewer feels glare; thus, the amount is based on a subjective sense of glare by the viewer. In the case of FIG. 4, it shows that the larger the amount of scintillation is, the more strongly a viewer feels glare. As shown in FIG. 4, the relationship shows that the more the moving velocity of the lenticular-lens screen 32 increases, the less the amount of scintillation is. Therefore, in order to keep the amount of scintillation less than a permissible limit "L," the moving velocity of the lenticular-lens screen 32 should be kept at a level higher than a predetermined velocity (here, velocity "A").

In addition, when the moving members placed nearest to a viewer are moved in the manner described in this embodiment, in order not to hinder the moving members from moving, owing to external factors such as a viewer's contacting the screen, it may be possible to construct the screen by adding a transparent protection panel on the viewer's side of the screen 3, so that the moving screen is protected (refer to FIG. 1).

In addition, in this embodiment, although the lenticular-lens screen 32 is moved, it is also possible to further add a diffusion member such as a diffusion sheet, apart from the lenticular-lens screen 32, and only the additional diffusion member is moved. It is also possible to move both a lenticular-lens sheet and the additional diffusion member described above.

Embodiment 2

In Embodiment 1, the lenticular-lens screen 32 held with a predetermined clearance between the screen and the frame 1 is circulated by the driving force from the motor mounted in the drive means 50. However, the lenticular-lens screen 32 may be supported by a supporting means or supporting members constructed of elastic members.

Figure 5:
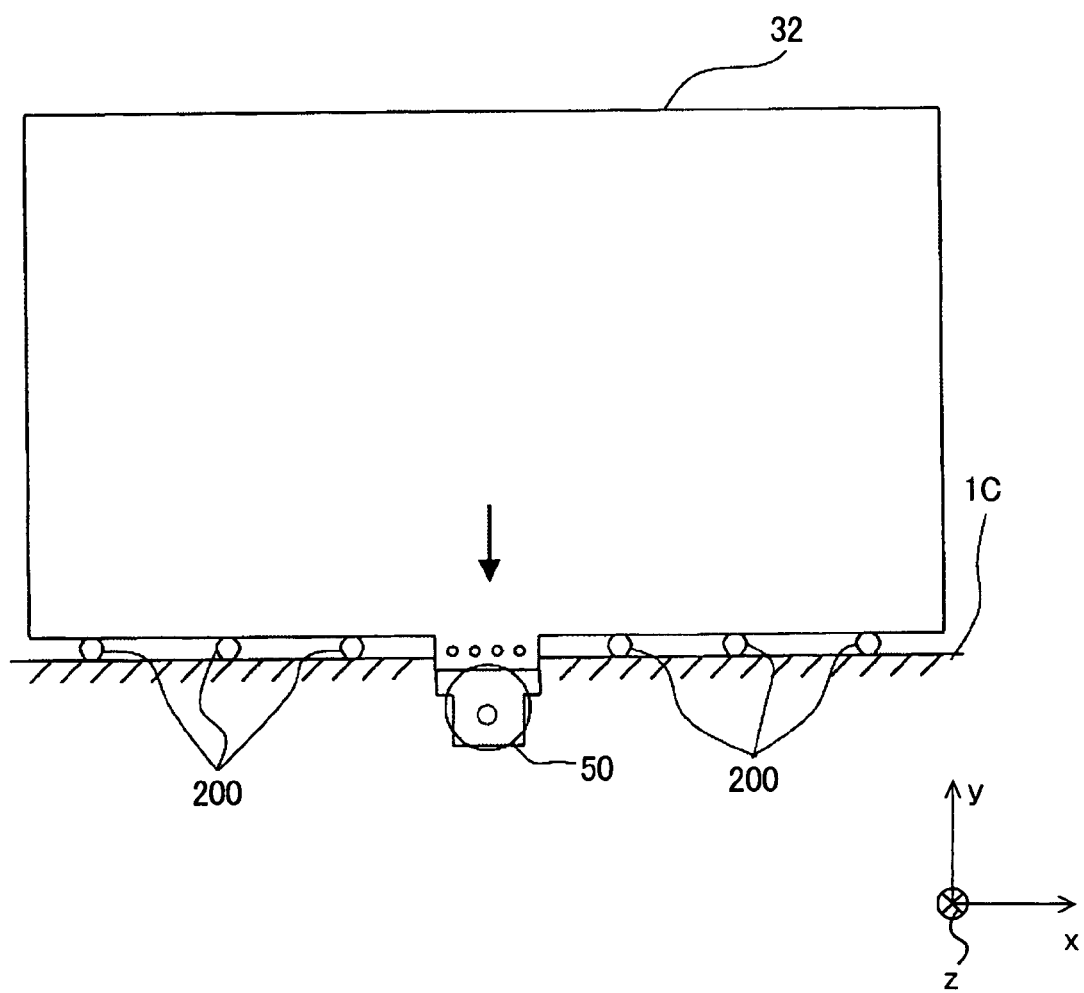
FIG. 5 is a diagram for explaining a driving movement of a diffusion member in Embodiment 2 of the present invention.

By using FIG. 5 through FIG. 7, the moving operations of the lenticular-lens screen 32 are explained as follows. In FIG. 5, a plurality of elastic blocks 200 each as a supporting member is disposed along a step 1c on the lower side of the frame 1. As shown in FIG. 5, the elastic blocks 200 allow upward movement of the lenticular-lens screen 32 by transforming according to compression force. In addition, as shown in FIG. 7, the elastic blocks 200 allow downward movement of the lenticular-lens screen 32 by transforming according to tension force. Moreover, as shown in FIG. 6, the elastic blocks 200 allow movement of the lenticular-lens screen 32 in left-hand and right-hand (lateral) directions by warping the overall shape according to shear force.

Figure 6:
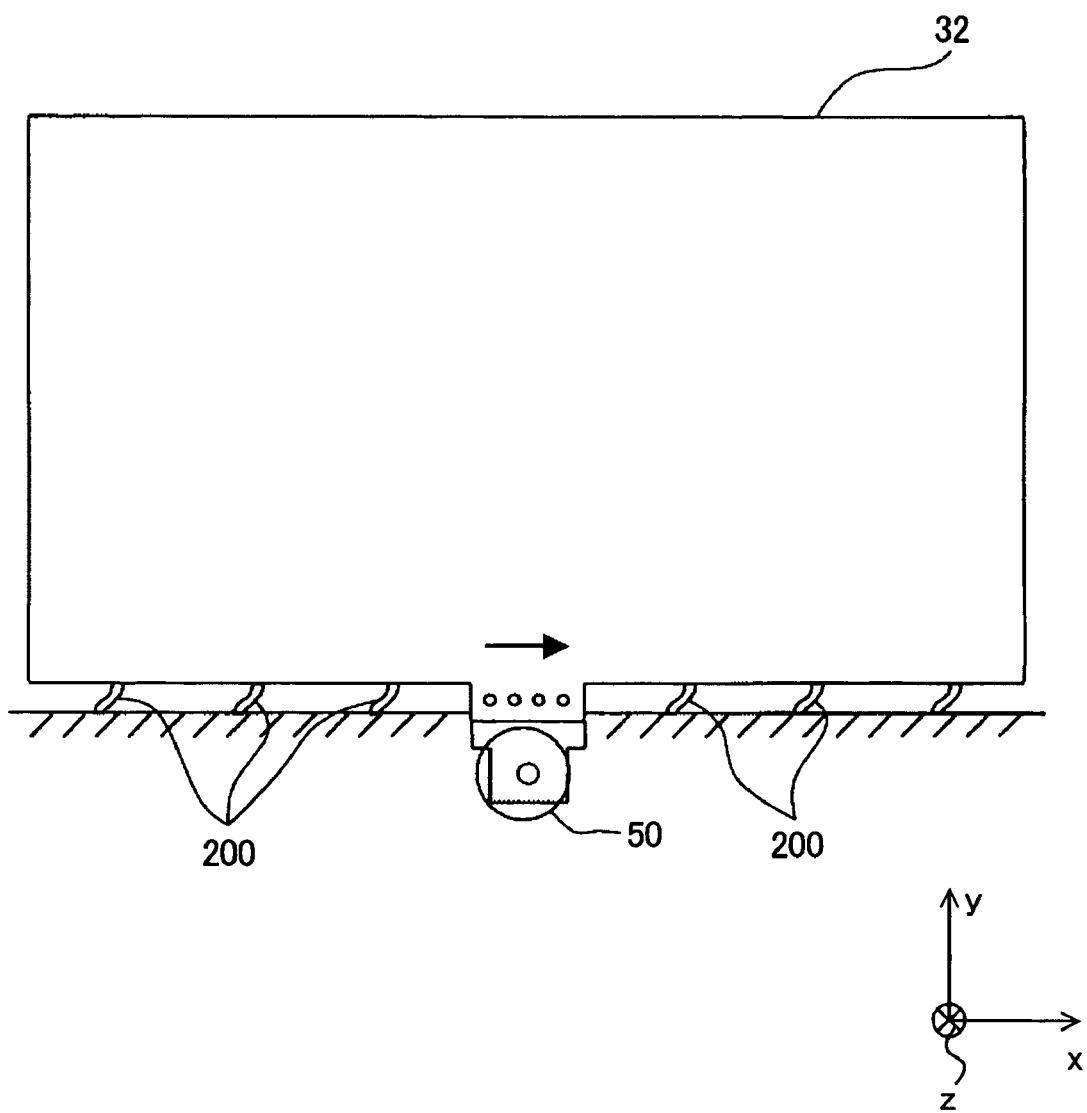
FIG. 6 is a diagram for explaining another driving movement of the diffusion member in Embodiment 2 of the present invention.
Figure 7:
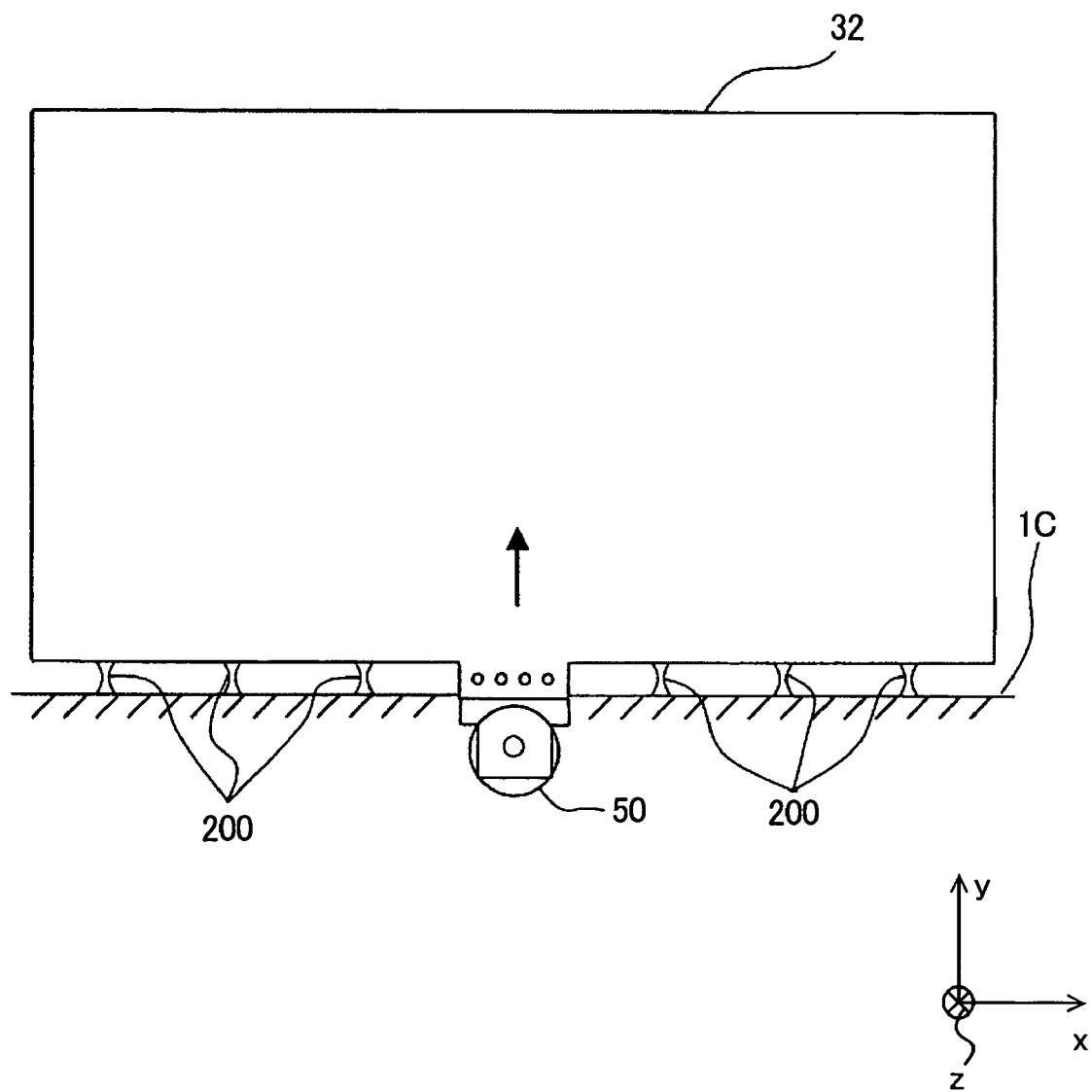
FIG. 7 is a diagram for explaining still another driving movement of the diffusion member in Embodiment 2 of the present invention.

By placing the lenticular-lens screen 32 upon these elastic blocks 200, owing to distortions of the elastic blocks 200, the lenticular-lens screen 32 can move upward and downward (vertically), and also in left-hand and right-hand (lateral) directions (i.e., in the parallel in-plane directions as shown in FIG. 5 through FIG. 7). Therefore, it is possible to reduce the load on a drive means or unit. Details of the operations are equivalent or similar to those in Embodiment 1; thus their explanation is omitted.

Although, in Embodiment 2, the explanation is given in a case in which the bottom part of the lenticular-lens screen 32 is supported by the elastic blocks 200; however, the lenticular-lens screen 32 can be circumferentially held by a predetermined number of the elastic blocks 200 (supporting members, not shown in the figures). In this case, it is possible to restrict the lenticular-lens screen 32 from moving perpendicularly to the screen face. Note that, the number of the elastic blocks 200 (the predetermined number described above) can be determined according to, for example, the specification of the image display projector.

Embodiment 3

Figure 8:
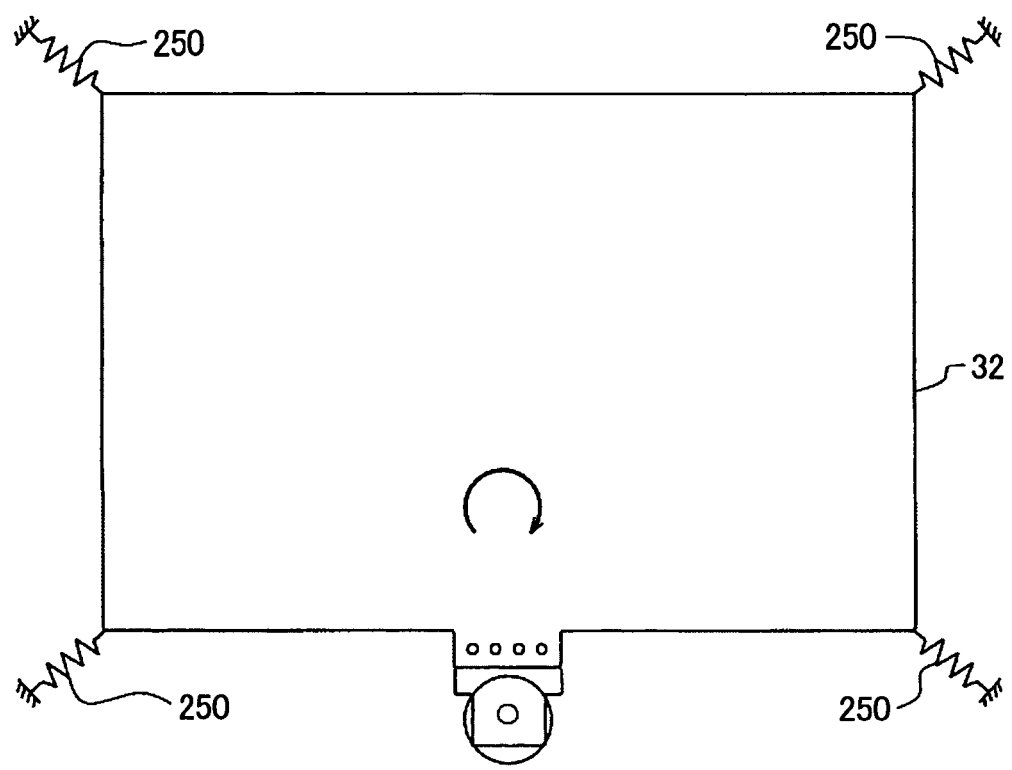
FIG. 8 is a diagram for explaining a method of supporting a diffusion member in Embodiment 3 of the present invention.
Figure 8:
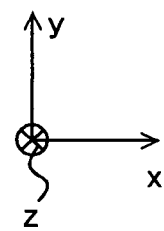

In Embodiment 2, the explanation has been given on a case in which the lenticular-lens screen 32 is supported by the elastic blocks 200 each as a supporting member is disposed along a lower side of the frame 1. However, as shown in FIG. 8, springs 250 each as a supporting member may be used to support the lenticular-lens screen 32 at four corners or along the circumference thereof. Details of the operations are equivalent or similar to those in Embodiment 1 or Embodiment 2; thus their explanation is omitted. Note that, the number of the springs 250 can be set according to, for example, the specification of the image display projector.

Embodiment 4

In Embodiment 1 through Embodiment 3, one such cam 51 is used as a driving source for the drive means 50. However, for example, as shown in FIG. 9, a pair of cams 501 and 502 can be used (i.e., the first cam and second one, respectively).

Figure 9:
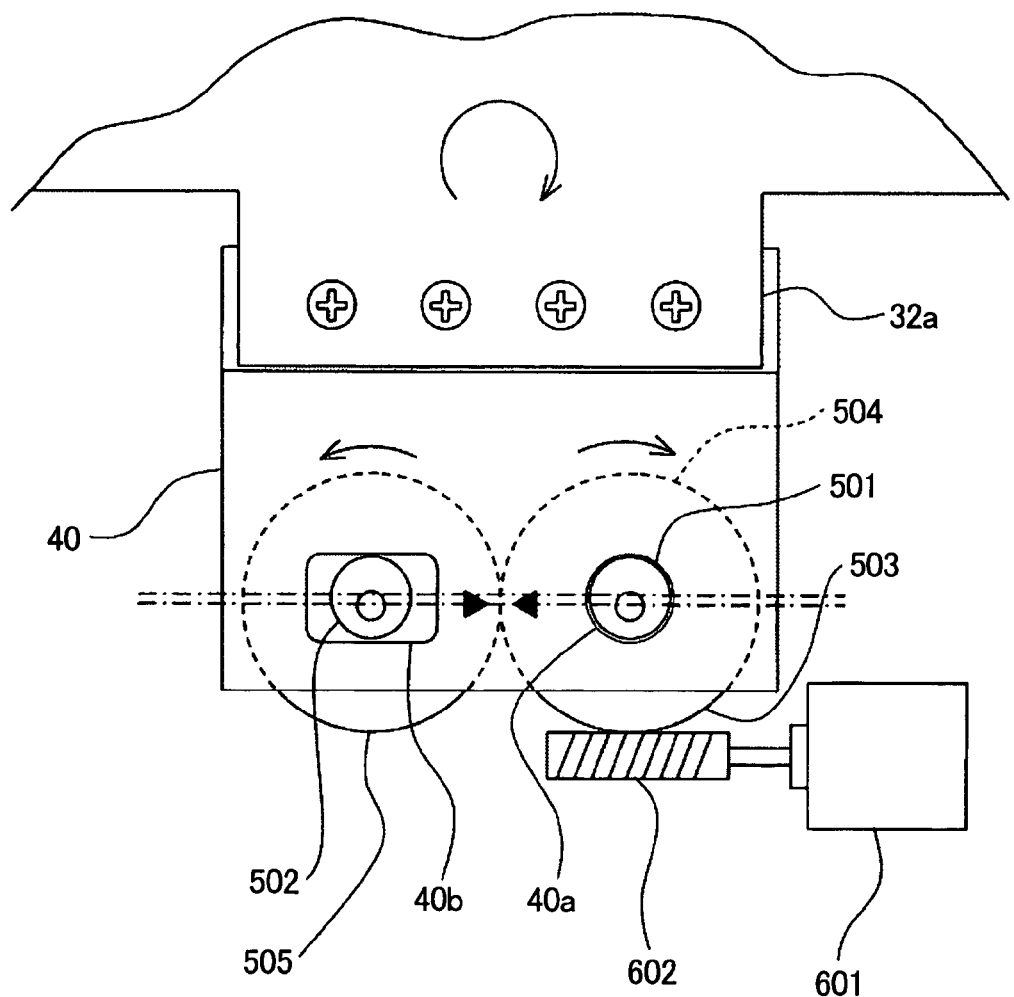
FIG. 9 is a diagram outlining a configuration of a drive means (unit) in Embodiment 4 of the present invention.
Figure 10:
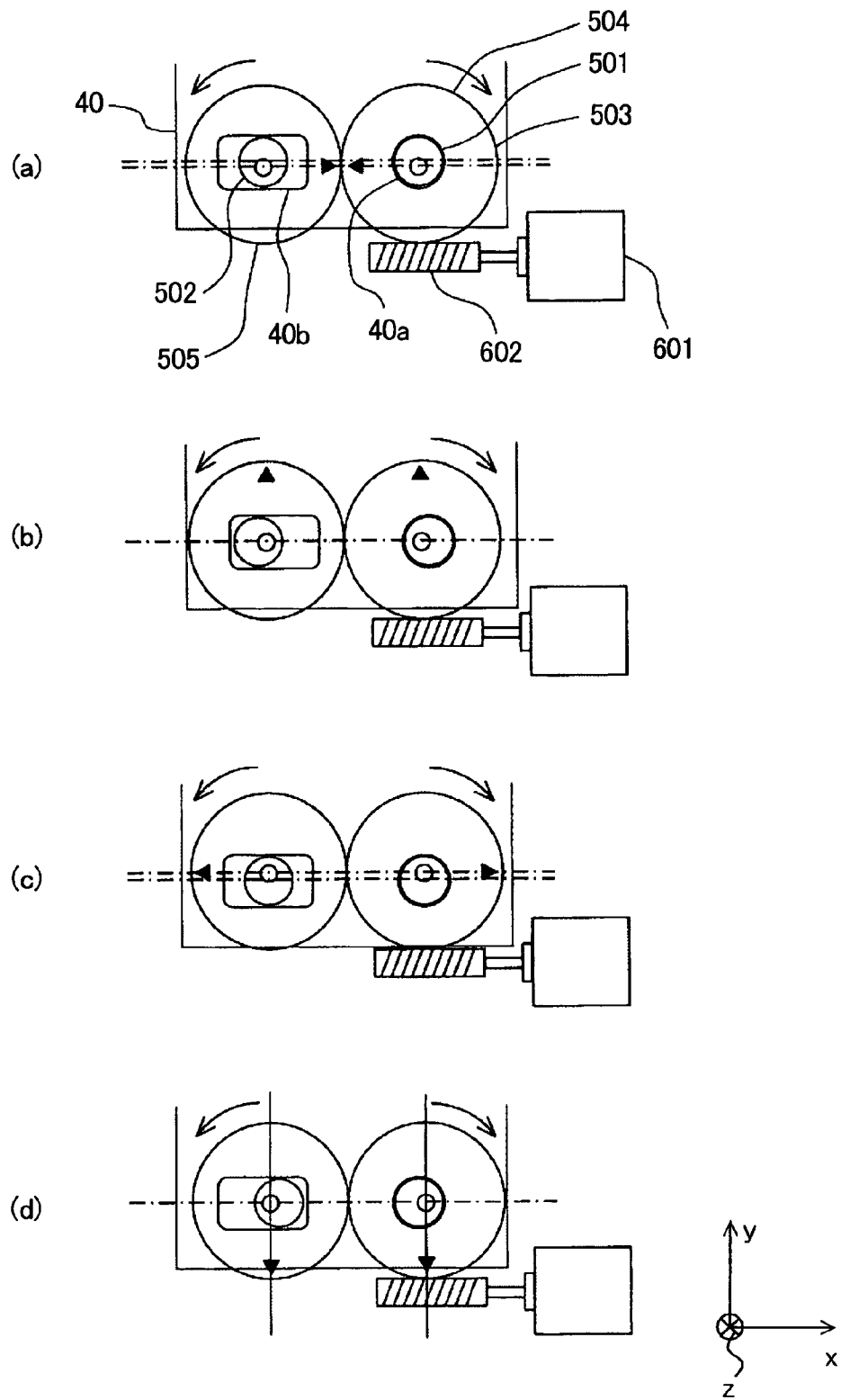
FIG. 10(a), FIG. 10(b), FIG. 10(c) and FIG. 10(d) are diagrams each for explaining the operation of the drive means in Embodiment 4 of the present invention.

In FIG. 9, one such drive means or unit 50 in this embodiment includes a motor 601 mounted with a worm gear 602 on its shaft, the first cam 501, a worm wheel 503 engaged with the worm gear 602, a first spur gear 504 coaxial with the worm wheel 503, the second cam 502, and a second spur gear 505 engaged with the first spur gear 504. In addition, such a transmitting member 40 in Embodiment 4 is fastened securely onto the protrusion 32a that is formed at the lowermost edge of the lenticular-lens screen 32. The transmitting member 40 is provided extending from the protrusion 32a toward further below. The transmitting member 40 is formed with a hole 40a into which the first cam 501 is movably inserted, and with an oblong (square) hole 40b into which the second cam 502 is movably inserted.

Next, the operations of constituting members each will be explained using FIG. 10(a), FIG. 10(b), FIG. 10(c), and FIG. 10(d), as follows. When the motor 601 rotates, its rotation is transmitted (or its force is transferred) to the first spur gear 504 via the worm gear 602 and the worm wheel 503. The second spur gear 505 that is engaged with the first spur gear 504 rotates in the direction reverse to the first spur gear 504. Coupled with the movement of the first cam 501, the transmitting member 40 starts circulating. At this moment, because of the action taken by the second cam 502 and the oblong hole 40b, the transmitting member 40 does not move rotationally in the direction toward which the first cam 501 rotates. Namely, because the second cam 502 contacts the upper inside of the oblong hole 40b, rotation of the transmitting member 40 in the direction toward which the first cam 501 rotates is restricted. Therefore, the lenticular-lens screen 32 that is mutually connected with the transmitting member 40 can accurately circulate, while guided by the frame 1, in the plane including the screen face (refer to FIG. 11).

Figure 12:
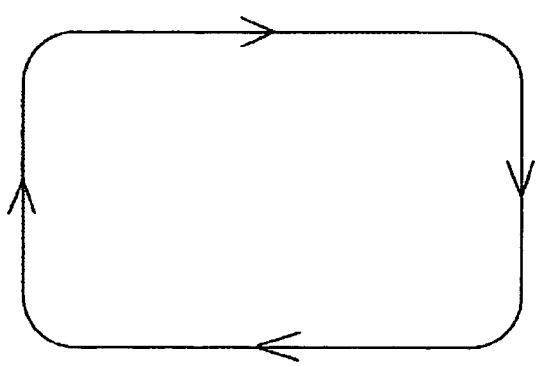
FIG. 12 is a brief diagram showing another moving track of the diffusion member.

In Embodiment 1 through Embodiment 4, the examples are shown in that the lenticular-lens screen 32 is moved periodically along an approximately circular moving track; however, without being limited by this, as far as the lenticular-lens screen 32 moves continuously, without having a pause, along the track such as an approximately rectangular track with rounded corners (FIG. 12) or a figure-eight looped track (FIG. 13), any track (orbit) along which the lenticular-lens screen 32 moves can be used.

Embodiment 5

In Embodiment 4, a pair of the first cam 501 and the second cam 502 each is mutually separated by a predetermined distance, and constructed so as to stabilize the lenticular-lens screen 32 in the plane including the screen face. However, without being limited by this arrangement, as shown in FIG. 14 and FIG. 15, it is also possible to construct that, by coupling a lever that swings according rotation of a cam with a link, attitude of the lenticular-lens screen 32 is stabilized in the plane including the screen face.

Figure 14:
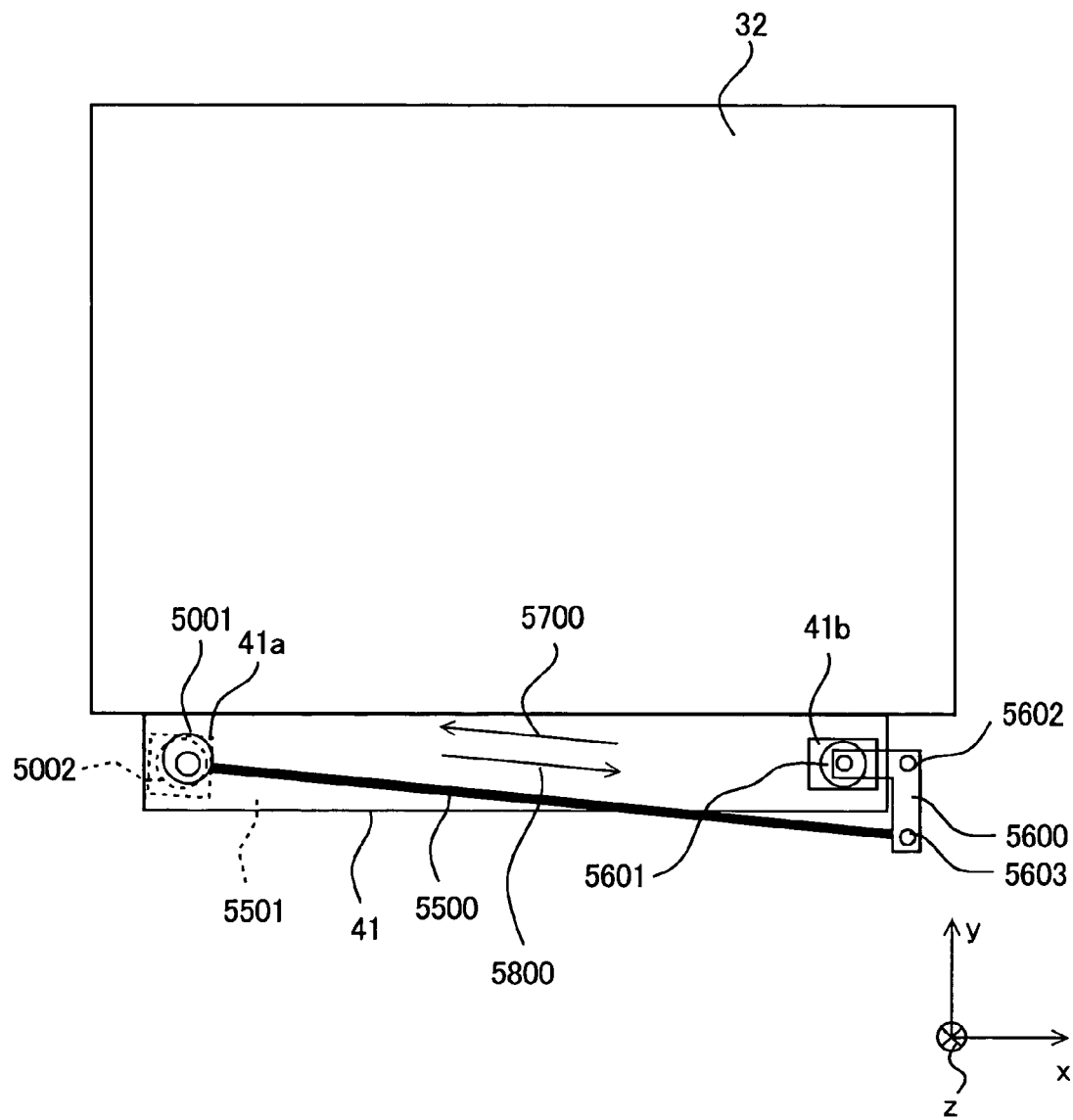
FIG. 14 is a diagram outlining a configuration of a screen drive unit in Embodiment 5 of the present invention.

FIG. 14 is a diagram outlining a configuration of a screen drive unit in Embodiment 5. In addition, FIG. 15 is an exploded diagram of the screen drive unit. In FIG. 14 and FIG. 15, "41" is a transmitting member that is fastened securely onto the lowermost edge of the lenticular-lens screen 32. At the left front side, the transmitting member 41 is formed with a circular hole 41a. In addition, at the right front side, the transmitting member 41 is formed with an oblong (square) hole 41b.

Figure 15:
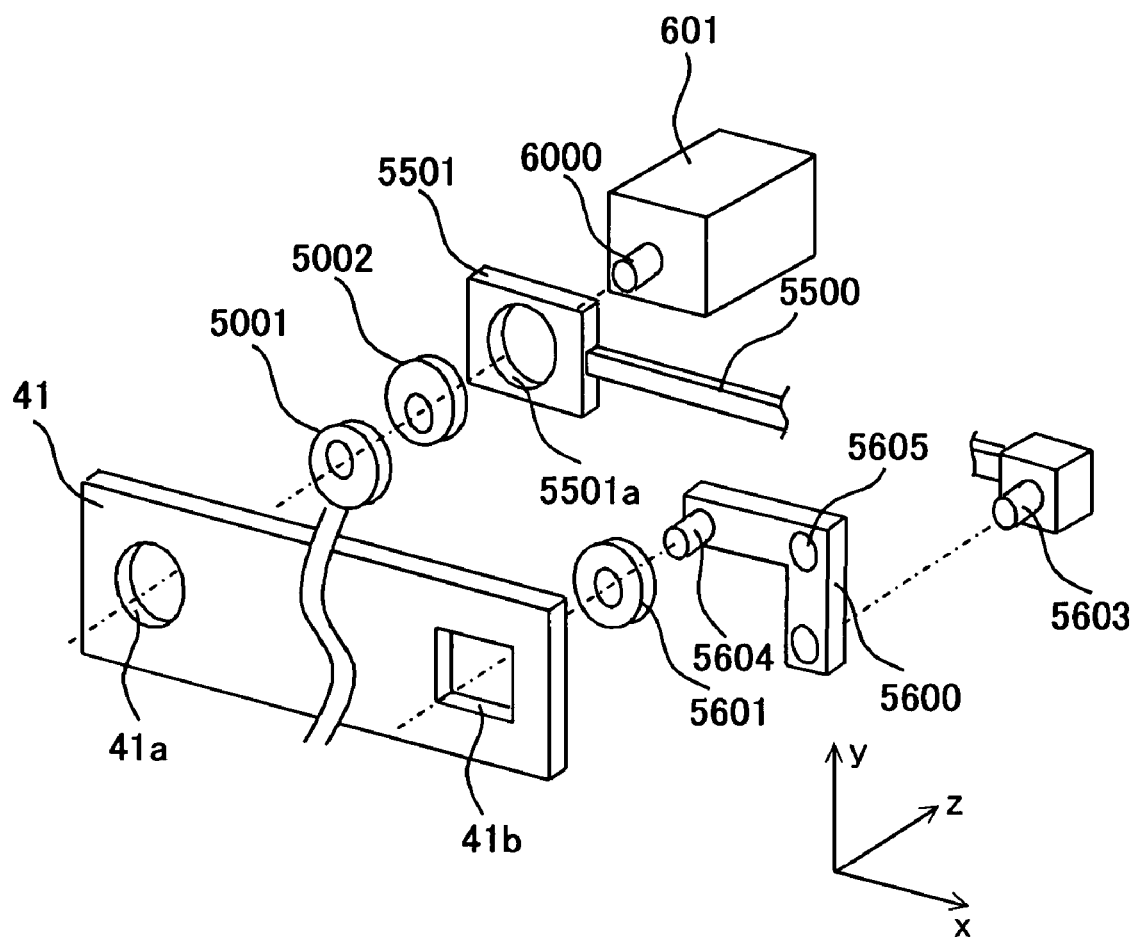
FIG. 15 is an exploded diagram of the screen drive unit in Embodiment 5 of the present invention.

"5001" is, as shown in FIG. 15, a first cam that is fastened securely onto a driving shaft 6000 of the motor 601 as a driving source. The first cam 5001 is movably inserted into the circular hole 41a. "5002" is a second cam that is, similarly to the first cam 5001, fastened securely onto the driving shaft. The second cam 5002 is movably inserted into a hole 5501a of a block 5501 that is provided on one end of a link 5500.

"5600" is a lever that is supported by a first shaft 5602 provide on a frame (not shown in the figures). A second shaft 5603 that is provided on the other end of the link 5500 is inserted at one end of the lever 5600. In addition, a first pin 5601 is inserted into a third shaft 5604 that is provided on the other end of the lever 5600. The first pin 5601 is movably inserted into the oblong hole 41b.

Next, the operations of the screen drive unit in this embodiment will be explained using FIG. 14 and FIG. 15 as follows. When the driving shaft 6000 of the motor 601 rotates, the first cam 5001 and the second cam 5002 that are fixed onto the driving shaft 6000 rotate. Because of the action taken by the first cam 5001 movably inserted into the circular hole 41a, the transmitting member 41 circulates. The second cam 5002 is fixed onto the driving shaft 6000 keeping a predetermined angular displacement with respect to the first cam 5001. Here, the predetermined angle is determined, when the first cam 5001 makes the transmitting member 41 move in the y-axis direction in FIG. 14, so that the second cam 5002 makes the link 5500 move in the direction indicated by the arrow 5700. Note that, in the following explanation, the y-axis direction is referred to as "upward," and the opposite to the y-axis direction is referred to as "downward." In addition, in FIG. 14, the x-axis direction is referred to as "rightward," and the opposite to the x-axis direction is referred to as "leftward."

When the link 5500 moves in the direction indicated by the arrow 5700, the lever 5600 swings clockwise around the first shaft 5602 as the fulcrum; thereby, the first pin 5601 moves the transmitting member 41 upward via the oblong hole 41b. Similarly, when the first cam 5001 moves the transmitting member 41 downward via the circular hole 41a, the link 5500 moves in the direction indicated by the arrow 5800 in FIG. 14. Then, the lever 5600 swings counterclockwise around the first shaft 5602 as the fulcrum; thereby, part of the oblong hole 41b moves downward, so that the transmitting member 41 moves downward. Note that, according to the action taken by the first pin 5601, when the transmitting member 41 moves leftward or rightward, the first pin 5601 slips leftward or rightward within the oblong hole 41b in the figure. Therefore, the first pin 5601 and the oblong hole 41b prevent the transmitting member 41 from rotating around the z-axis in the figure; however, they do not interfere that the transmitting member 41 moves rightward or leftward.

That is to say, when the first cam 5001 circulates on the left side of the transmitting member 41, according to the movement thereof in the upward and downward (vertical) directions based on the circular movement, the lever 5600 swings around the first shaft 5602; thereby, the right side of the transmitting member 41 moves in the upward and downward directions. Because of the operations of constituting members each explained above, the transmitting member 41 can be stably circulated. Therefore, the lenticular-lens screen 32 that is fixed on the transmitting member 41 can also be stably circulated. Moreover, for the sake of rotating parts having larger load than other constituting members, such as the first cam 5001, the second cam 5002, or the first pin 5601, it may be possible to insert ball bearings each or the like, so that the load when they move rotationally can be reduced.

Embodiment 6

Figure 16:
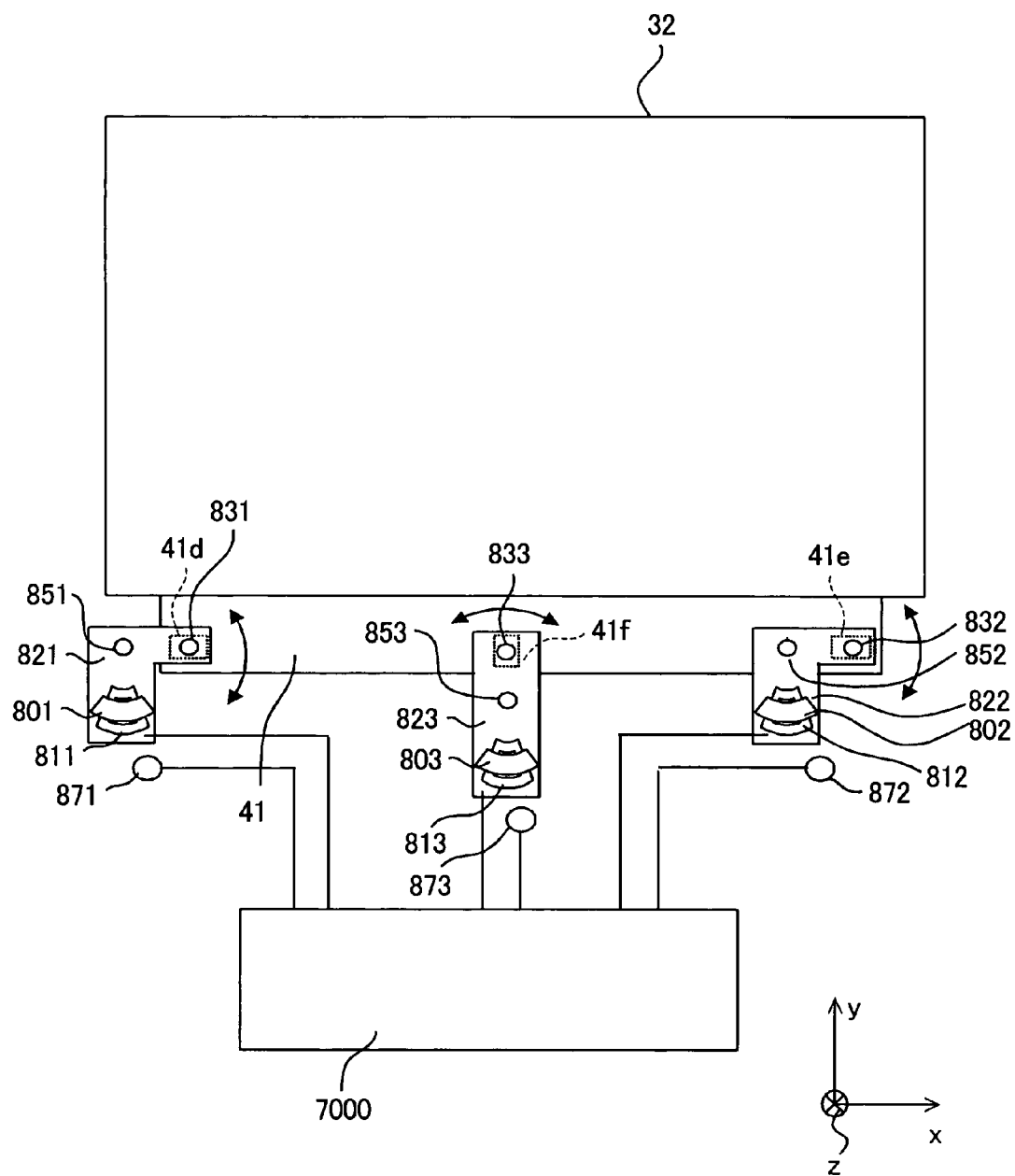
FIG. 16 is a diagram for explaining a screen drive unit in Embodiment 6 of the present invention.

FIG. 16 is a diagram outlining a configuration of a screen drive unit in Embodiment 6. In Embodiment 6, by combining linear motors each can drive in one-dimensional direction, the configuration will be explained so that the screen (such lenticular-lens screen 32) is moved in two-dimensional directions. In FIG. 16, "41d" and "41e" are oblong (square) holes each formed near the left-hand and right-hand (lateral) ends of such transmitting member 41 in this embodiment, respectively. The width of the oblong holes 41d and 41e each in the lateral directions is larger in length than the height thereof in the upward and downward (vertical) directions. Note that, hereinafter, the oblong hole 41d is also referred to as a first oblong hole 41d. In addition, the oblong hole 41e is also referred to as a second oblong hole 41e.

"41f" is an oblong (square) hole formed in approximately the center of the transmitting member 41 (hereinafter, referred to as a third oblong hole). The height of the third oblong hole 41f in the vertical directions is larger in length than the width thereof in the lateral directions. "821" is a first lever that is formed approximately L-shaped. The first lever 821 is held by a shaft 851 so as to swing around the shaft 851 as the fulcrum.

"811" is a first coil that is fixed onto the first lever 821. The first coil 811 is disposed so as to oppose a first magnet 801 that is fixed onto a frame (not shown in the figure). "831" is a first pin. The first pin 831 is provided for the first lever 821. In addition, the first pin 831 is movably inserted into the first oblong hole 41d.

"822" is a second lever that is formed approximately L-shaped. The second lever 822 is held by a shaft 852 so as to swing around the shaft 852 as the fulcrum. "812" is a second coil that is fixed onto the second lever 822. The second coil 812 is disposed so as to oppose a second magnet 802 that is fixed onto the frame. "832" is a second pin. The second pin 832 is provided for the second lever 822. In addition, the second pin 832 is movably inserted into the second oblong hole 41e.

"823" is a third lever. The third lever 823 is held by a shaft 853 that is provided approximately in the center of the transmitting member 41, so as to swing around the shaft 853 as the fulcrum. "813" is a third coil that is fixed onto the third lever 823. The third coil 813 is disposed so as to oppose a third magnet 803 that is fixed onto the frame. "833" is a third pin. The third pin 833 is provided for the third lever 823. In addition, the third pin 833 is movably inserted into the third oblong hole 41f.

Note that, the linear motors each are constructed by combining the first coil 811 and the first magnet 801, the second coil 812 and the second magnet 802, and also the third coil 813 and the third magnet 803.

"871" is a first position sensor that detects displacement of the first lever 821. "872" is a second position sensor that detects displacement of the second lever 822. "873" is a third position sensor that detects displacement of the third lever 823. "7000" is a controller that controls currents supplied to the coils 811, 812 and 813, based on the detected results obtained from the position sensors 871, 872 and 873, respectively.

Next, the operations of the screen drive unit in this embodiment will be explained using FIG. 16 as follows. The first lever 821 is controlled by the controller 7000 so that the relationship between displacement detected by the first position sensor 871 and time describes approximately a sine wave (sinusoid). Similarly, the second lever 822 is controlled by the controller 7000 so that the relationship between displacement detected by the second position sensor 872 and time describes approximately a sine wave, and at the same time, the second lever 822 is synchronized with movement of the first lever 821. Note that, hereinafter, the sine wave corresponding to the displacement of the first lever 821, or the sine wave corresponding to that of the second lever 822 is referred to as the "first sine wave."

As described above, the transmitting member 41 is supported by the first lever 821 and the second lever 822. For this reason, the transmitting member 41 can move periodically in upward and downward (vertical) directions, without rotating around the z-axis in the figure.

Moreover, the third lever 823 is controlled by the controller 7000 so that the relationship between displacement detected by the third position sensor 873 and time describes approximately a sine wave (sinusoid). However, the sine wave corresponding to displacement of the third lever 823 (hereinafter, referred to as a "second sine wave") leads (or lags) by 90 degrees in the phase with respect to the first sine wave. In addition, the amplitude of the first sine wave is set at the same value as that of the second sine wave.

Figure 17:
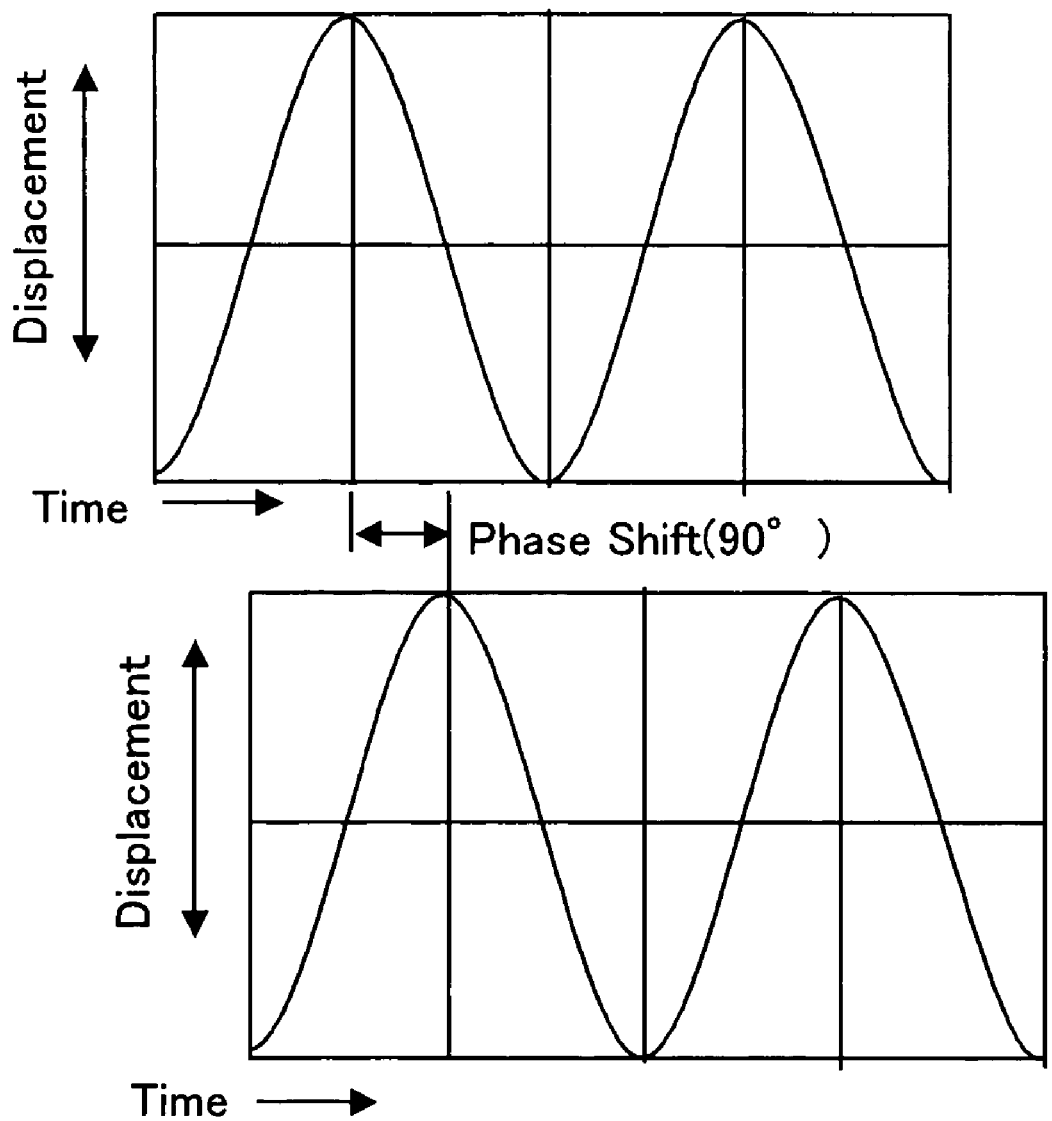
FIG. 17 is a diagram for explaining the relationship between a first sine wave and a second sine wave.

FIG. 17 is a diagram for explaining the relationship between the first sine wave and the second sine wave. The first lever 821 and the second lever 822, and the third lever 823 are controlled by the controller 7000 so that displacement of each lever (group) holds the relationship as shown in FIG. 17. According to movement of the third lever 823, the transmitting member 41 can move periodically in the left-hand and right-hand (lateral) directions.

Figure 11:
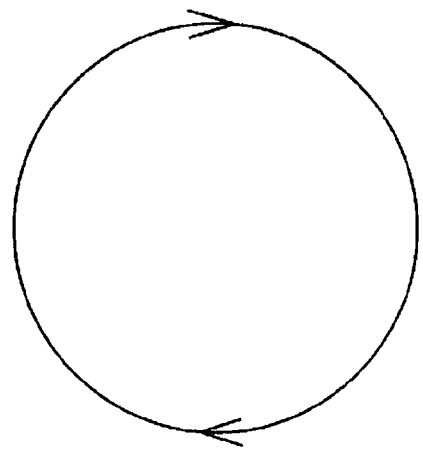
FIG. 11 is a brief diagram showing a moving track of a diffusion member.

The transmitting member 41 circulates based on the synthesis by both reciprocating movements by the first lever 821 and the second lever 822 in the vertical directions, and reciprocating movement by the third lever 823 in the lateral directions, as shown in FIG. 11. Therefore, the lenticular-lens screen 32 that is fixed on the transmitting member 41 also circulates as shown in FIG. 11.

In addition, in Embodiment 6, the explanation has been given on a case in which the transmitting member 41 is moved by driving force of the linear motors via each of the levers 821, 822 and 823; however, the construction can be so arranged that the lenticular-lens screen 32 is directly held by such linear motors. In this case, for example, the linear motors can be constructed by fixing the magnets onto the lenticular-lens screen 32, and by fixing the coils onto the frame. In addition, when the lenticular-lens screen 32 is directly held by the linear motors, the linear motors may be disposed along the circumference of the lenticular-lens screen 32. In addition, the linear motors may be disposed on the lower side of the lenticular-lens screen, and then supporting members such as springs can be used to support the lenticular-lens screen 32 along the circumference thereof.

As described above, when the lenticular-lens screen 32 is directly held by the linear motors, the number of components to realize the screen drive unit can be reduced. Therefore, manufacturing costs of the screen drive unit can be reduced. In addition, constituting members that produce friction, such as a lever and a shaft that supports the lever, can be omitted. Thus, it is possible, over long periods, to stably circulate the lenticular-lens screen 32.

Figure 13:
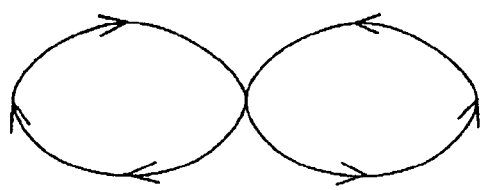
FIG. 13 is a brief diagram showing still another moving track of the diffusion member.

Moreover, in Embodiment 5 or in Embodiment 6, the examples are shown in that the lenticular-lens screen 32 is moved periodically along an approximately circular moving track. However, similarly to Embodiment 1 through Embodiment 4, it is possible to move the lenticular-lens screen 32 along the track such as an approximately rectangular track with rounded corners (FIG. 12), or a figure-eight looped track (FIG. 13). Namely, as far as the lenticular-lens screen 32 is moved continuously, without having a pause, along any track (orbit) along which the lenticular-lens screen 32 moves, it can be moved by any way or means.

Furthermore, in Embodiment 1 through Embodiment 6, the explanation has been given on a case in which the lenticular-lens screen 32 is moved; when the Fresnel lens 31 can be held in such a manner that moving displacement of the Fresnel lens 31 in the z-axis direction in FIG. 1 can be limited so that a viewer is not so concerned about image distortion, while fixing the lenticular-lens screen 32, the Fresnel lens 31 may be circulated.

While the present invention has been shown and described in detail, the foregoing description is in all aspects illustrative and not restrictive. It is therefore understood that numerous modifications and variations can be realized without departing from the scope of the invention.

INDUSTRIAL APPLICABILITY

The present invention can be applied to home-use or industrial image display projectors. When an image display area (thus, the screen) increases in size, scintillation becomes more visible. Therefore, the present invention is suitable for utilizing image display projectors with large screens.

What is claimed is:

1. An image display projector, comprising:
an optical engine for emitting light according to an inputted imaging signal;
a Fresnel lens disposed to receive the light emitted from said optical engine, for emitting the incident light as collimated light;
a diffusion member, placed in a position frontal to said Fresnel lens in the light-traveling direction, for emitting diffused light, by diffusing the collimated light emitted from said Fresnel lens; and
a drive unit for moving either said Fresnel lens or said diffusion member, repeatedly along a predetermined track, in a parallel plane, the parallel plane being a plane parallel to either the plane from which the collimated light is emitted or the plane from which the diffused light is emitted, wherein:
the moving velocity of either said Fresnel lens or said diffusion member is continuously larger than zero within said parallel plane during the movement of either said Fresnel lens or said diffusion member along said predetermined track,
the drive unit further comprises:
a motor;

a first cam for rotating around a first shaft based on the driving force of said motor;

a rotating member for rotating, according to the rotation of said first cam, around a second shaft disposed parallel to the first shaft; and a transmitting member, having a first hole for receiving said first cam and a second hole for receiving said rotating member, provided along the perimeter of either the Fresnel lens or the diffusion member, the first hole and the second hole are disposed in said parallel plane spaced apart by a predetermined distance from each other, and the transmitting member moves based on the driving force of said motor, transferred via said first cam, so that either said Fresnel lens or said diffusion member moves in the predetermined track.

2. The image display projector as set forth in claim 1, wherein the optical engine further comprises:

a light source;

a spatial modulator for spatially modulating, according to the imaging signal, the light from said light source, to emit light so as to form images that correspond to the imaging signal; and an optical projection system for emitting light, emitted from said spatial modulator, onto the Fresnel lens so as to enlarge the images.

3. The image display projector as set forth in claim 1, further comprising a supporting member for elastically supporting, within said parallel plane, movement of either the Fresnel lens or the diffusion member.

4. The image display projector as set forth in claim 1, wherein moving displacement of the Fresnel lens in any direction within the plane parallel with said Fresnel lens is larger than the pitch of said Fresnel lens.

5. The image display projector as set forth in claim 1, wherein the diffusion member is a lenticular lens, and moving displacement of said lenticular lens in any direction within the plane parallel with said lenticular lens is larger than the pitch of said lenticular lens.

6. The image display projector as set forth in claim 1, wherein the predetermined track is circular.

7. The image display projector as set forth in claim 1, wherein the predetermined track is round-cornered polygonal.

8. The image display projector as set forth in claim 1, wherein the predetermined track is figure-eight looped.

9. The image display projector as set forth in claim 1, wherein the second hole is formed in such a way that, in said parallel plane, the width in a first direction in line with the predetermined distance is wider than the width in a second direction perpendicular to the first direction.

10. The image display projector as set forth in claim 1, wherein the rotating member is a second cam.

11. An image display projector, comprising:

an optical engine for emitting light according to an inputted imaging signal;

a Fresnel lens disposed to receive the light emitted from said optical engine, for emitting the incident light as collimated light;

a diffusion member, placed in a position frontal to said Fresnel lens in the light-traveling direction, for emitting diffused light by diffusing the collimated light emitted from said Fresnel lens; and a drive unit for moving either said Fresnel lens or said diffusion member, repeatedly along a predetermined track, in a parallel plane, the parallel plane being a plane parallel to either the plane from which the collimated light is emitted or the plane from which the diffused light is emitted, wherein:

the moving velocity of either said Fresnel lens or said diffusion member is continuously larger than zero within said parallel plane during the movement of either said Fresnel lens or said diffusion member along said predetermined track, the predetermined track is circular, the drive unit further comprises:

a first drive member for reciprocally moving either the Fresnel lens or the diffusion member, in said parallel plane, along a first direction; and at least two second drive members for reciprocally moving either the Fresnel lens or the diffusion member, in said parallel plane thereof, along a second direction perpendicular to the first direction, displacement of either said Fresnel lens or said diffusion member, according to a reciprocating movement by said first drive member, over time describes a sine function, displacement of either said Fresnel lens or said diffusion member, according to a reciprocating movement by said second drive members, over time describe a sine function, the phase of the sine function according to said first drive member either leads or lags by 90 degrees the phase of the sine function according to said second drive members, and the first direction is a longitudinal direction with respect to either the Fresnel lens or the diffusion member.

12. The image display projector as set forth in claim 1, wherein the diffusion member further comprises:

a plurality of light diffusion components each constructed for diffusing incident light, wherein the drive unit moves at least that light diffusion component, from among the plurality of light diffusion components, which is located nearest to the viewer.

13. The image display projector as set forth in claim 1, wherein a transparent protection panel is provided in a position frontal to the diffusion member in the light-traveling direction.

14. The image display projector as set forth in claim 11, further comprising:

a supporting member for elastically supporting, within said parallel plane, movement of either the Fresnel lens or the diffusion member.

15. An image display projector, comprising:

an optical engine for emitting light according to an inputted imaging signal;

a Fresnel lens disposed to receive the light emitted from said optical engine, for emitting the incident light as collimated light;

a diffusion member, placed in a position frontal to said Fresnel lens in the light-traveling direction, for emitting diffused light by diffusing the collimated light emitted from said Fresnel lens; and a drive unit for moving either said Fresnel lens or said diffusion member, repeatedly along a predetermined track, in a parallel plane, the parallel plane being a plane parallel to either the plane from which the collimated light is emitted or the plane from which the diffused light is emitted, wherein:

the moving velocity of either said Fresnel lens or said diffusion member is continuously larger than zero within said parallel plane during the movement of either said Fresnel lens or said diffusion member along said predetermined track, the drive unit further comprises:
  a motor;
  a first cam for rotating around a first shaft based on the driving force of said motor;
  a swinging member for swinging, according to the rotation of said first cam, around a second shaft disposed parallel to the first shaft; and
  a transmitting member, having a first hole for receiving said first cam and a second hole for receiving said swinging member, provided along the perimeter of either the Fresnel lens or the diffusion member,
  the first hole and the second hole are disposed in said parallel plane spaced apart by a predetermined distance from each other, and
  the transmitting member moves based on the driving force of said motor, transferred via said first cam, so that either said Fresnel lens or said diffusion member moves in the predetermined track.

16. The image display projector as set forth in claim 15, further comprising:
  a supporting member for elastically supporting, within said parallel plane, movement of either the Fresnel lens of the diffusion member.

* * * * *